July 21, 1964     A. SCHOENWALD     3,141,956
BATTERY POWERED ELECTRIC SOLDERING IRON
Filed Sept. 15, 1961
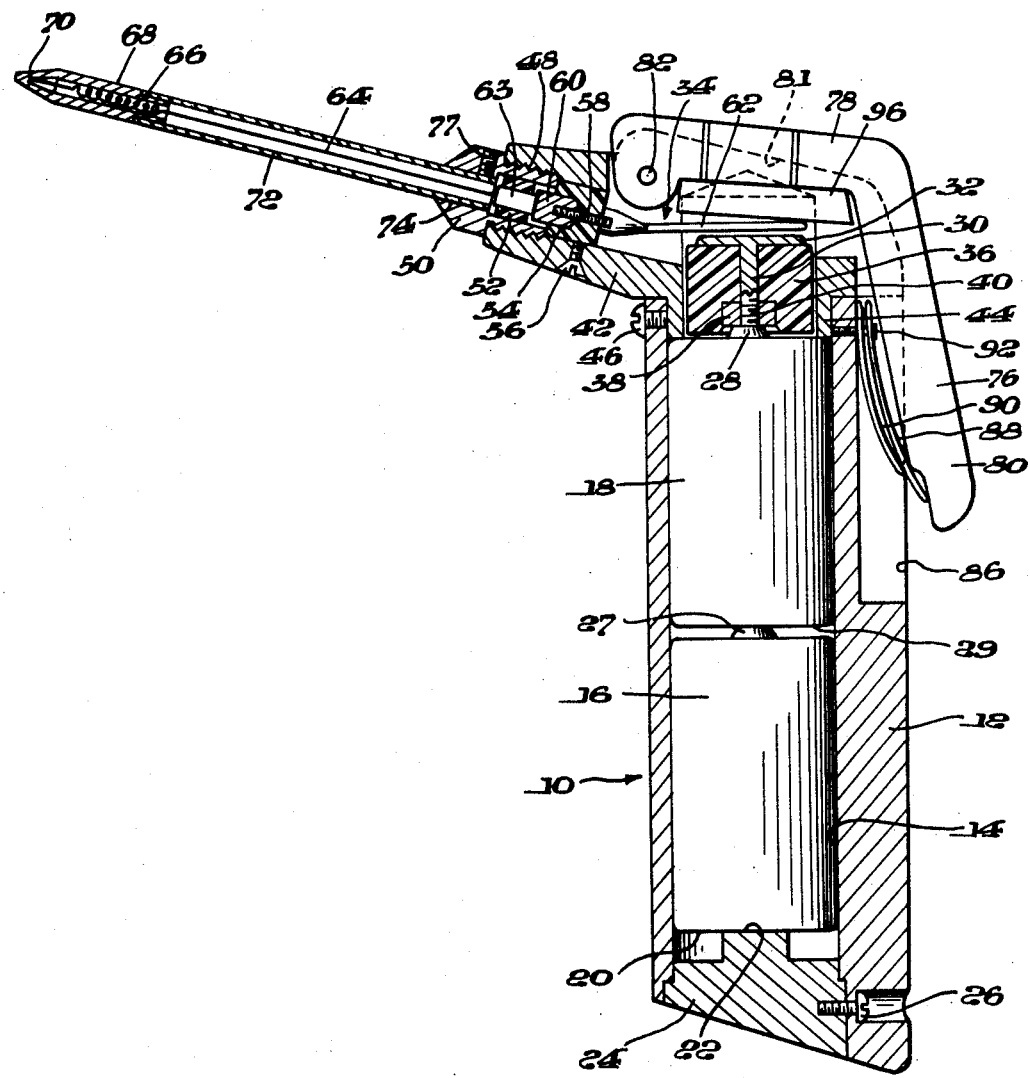
INVENTOR.
ALEXANDER SCHOENWALD.
BY
HIS ATTORNEY

United States Patent Office 3,141,956
Patented July 21, 1964

3,141,956
BATTERY POWERED ELECTRIC SOLDERING
IRON
Alexander Schoenwald, Grove City, Pa., assignor to P. Wall Manufacturing Company, Grove City, Pa., a corporation of Pennsylvania
Filed Sept. 15, 1961, Ser. No. 138,427
3 Claims. (Cl. 219—233)

This invention relates to certain improvements in an electric soldering iron and is related to my copending application Serial No. 111,579, filed May 22, 1961.

The present invention, similar to my previously filed copending application, utilizes battery means for electrically developing the thermal energy required for soldering iron operation. The present invention incorporates generally all of the improved functional characteristics of my copending application disclosure but includes some additional advantages which make it a preferred embodiment for some applications.

It is one of the objects of the present invention, to provide a battery-operated soldering iron which will develop, with a small voltage source, a sufficient current of electrical energy for producing heat in a relatively short period. The temperatures achieved by this heat are satisfactory for soldering operation. It is also an object of the invention that this last described operation be achieved by means of a simple and inexpensive mechanism which embodies a reduced number of components all of which can be easily and inexpensively manufactured and readily assembled to form the complete unit.

A further object of the invention, is to produce an electric soldering iron utilizing battery means as a source of power and which produces current at a sufficiently low level of voltage so that portions of the soldering iron can be made electrically conductive and will therefore form a part of the electrical circuit which operates the heating coil. The current so conducted is however, of such low magnitude that the operator will not experience any electrical shock sensation.

Another object of the invention, is to provide a simple, inexpensive switch which forms a part of the electric soldering iron combination and which can be easily operated and held in a switch-closed position providing continuous soldering iron operation but without producing fatigue to the user. The soldering iron can thus be kept in an operating condition for as long as necessary.

In the present invention, as well as in my previous invention, it is intended that the heating effect be localized in the tip end of a projected portion of the soldering iron so that very little of its heat reaches the operator's hand which encircles the handle portion of the soldering iron, and in this way the soldering operation proceeds comfortably for an indefinite period. This feature of the invention also makes it possible to eliminate insulating media which dissipate the heat in an unusable form and therefore tend to produce an inefficient soldering operation. This object is achieved by a novel arrangement of the electrical conductors which are also made to serve as efficient thermal conductors concentrating the heat energy at the tip of the soldering iron.

It is well known that soldering irons are at times subject to rough handling at the construction site and it is therefore an object of the present invention to provide a rugged, tough structure, not easily damaged and which will function reliably to give trouble-free service under actual use conditions.

Other objects and features of this invention will become apparent from a consideration of the following description which proceeds with reference to the accompanying drawing, wherein the single figure is a cross section of a soldering iron incorporating my invention and in which the switch is in an open position and the soldering iron is non-operative.

Referring now to the drawing, the soldering iron, designated generally by reference numeral 10 includes a handle portion 12 of hollow interior construction providing a cylindrical bore 14 which is proportioned to receive therein two dry-cell batteries, 16 and 18, which may be of 1.25 volts capacity, merely to mention one example embodiment of the invention. Each battery includes a positive and negative terminal and as shown, they are connected in series with the one battery, 16, shown grounded through its negative terminal, 20, to a contact 22 of base 24 securely connected to handle 12 through machine screws or the like 26. The positive terminal 27 of battery 16 is connected to negative terminal 29 of battery 18 and in this way, the two batteries are connected in series. The handle 12 is connected in series with the batteries and is of electrically conductive material such as aluminum or the like.

The positive terminal 28 of battery 18 contacts a stem 30 terminating in flange 32 and forming one terminal of a switch, designated generally by reference numeral 34, and which is in a normally open position. The positive terminal 28 is prevented from shorting through the handle 12 by means of non-conductive insulating material 36 which is clamped against flange 32 by means of a nut 38 threadedly received on the end 40 of stem 30.

The switch 34 is mounted within head 42 having an annular flange 44 which is proportioned to fit within the opening 14 of the handle 12 and bears against battery 18 to hold the batteries 16 and 18 against movement therein. The head 42 is also fo electrically conductive material, such as aluminum, and to insure good contact with the handle 12 as well as to prevent turning of the head 42, I use a number of set screws 46 which bear against the flange 44 of head 42.

The head 42 has a threaded stepped opening 48 which receives a hollow fitting 50 therein and is of substantially the same construction as the fitting used in my previous application disclosure. The fitting 50 is electrically conductive and is in series connection with the head 42. Within the fitting 50 is an insulating sleeve 52 and in the unthreaded part of the opening is a second insulating sleeve 54 held therein by a set screw 56. Passing through sleeve 54 is a threaded stem 58 which is secured at one end to a contact 60, fitted within a recess of sleeve 54, and at the other stem end, is mounted a resilient switch arm 62 which in its normal, unbiased position assumes the position shown in the drawing. The switch arm 62 can be loaded downwardly to effect electrical contact with flange 32 to operate the soldering iron, at which time, electrical contact is made from the arm 62 through stem 58 and contact 60 to the bar 63 thence through conductor wire 64 to heating coil 66 which is disposed within soldering tip 68 closed at end 70. The tip 68 is located at the end of a projecting tubular shank 72 which forms a part of the electrical circuit from the conductor 64 through coil 66 to the tip 70 thence to tubular member 72 and back ultimately through handle 12 to the batteries 16, 18. In order that the conductor 64 will not contact, the interior surface of the hollow tubular member 72 and thereby short circuit the heating coil 66, the tubular member 72 can be slid within opening 74 to effect tension in the conductor 64 and the set screw 77 then tightened to maintain tension in the conductor 64.

Because the coil 66 is located at the tip 68 and has an electrical connection with the closed end 70 of the tip, the heating effect produced by the coil 66 is remarkably localized within the tip 70 so that the temperature gradient is steep and permits the attainment of temperature thereof, within a very short period, in the range of 800° F., this being a suitable soldering temperature. At the same time, these temperatures are achieved, the operator can comfortably hold the handle 12 without discomfort because of the steep temperature gradient in which heating is localized at the tip 70. Also, because heating is confined to this one area, the electrical energy is expended at best efficiency because all of the electrical energy, converted to thermal or heat energy, is used at the soldering zone. Another factor which accounts for my improved efficiency is that electrical insulation is eliminated owing to the lower voltages used and therefore less thermal energy is wasted in transferring heat from the coil to the soldering tip.

By way of further explanation of a working example of the invention, and not to limit the invention in any manner, I have used a heating coil 66 of the chrome-nickel alloy type and consisting of 25 gage size which provides a resistance of about 0.40 ohm per inch. Because the total combined voltage of the batteries 18 and 16 is 2.5 volts, this provides a current of 5 amperes which is sufficient, according to the relationship, Energy=$I^2R$, to develop heat to raise the tip 68 to a temperature of about 800° F. within a few seconds.

As explained in my prior application, the reason why this heat is used most efficiently is that it is communicated by conduction through the end of the heating coil and I do not rely solely on convection heat transfer which is the case in conventional, previously used soldering iron mechanisms.

To operate the soldering iron, the user depresses switch arm 62 and thereby initiating soldering operation, and to perform this, I employ a trigger 76 having two angularly disposed arms 78 and 80, the one 78 being located within a recess 81 of the head 42 and pivotally mounted within this recess by means of a pivot pin or the like 82. The arm 80 which fits within recess 86 is the portion manually gripped during operation and fits within recess 86 where it is acted against by leaf springs 88, 90 which bear against arm 80 and are supported by bolt 92.

The arm 78 has an electrically non-conductive abutment 96 which contacts switch arm 62 to effect its downward movement into engagement with flange 32 when the arm 76 is rotated clockwise about the pivot-pin support 82, thus completing the electrical circuit from batteries 16, 18, stem 40, flange 32, switch arm 62, stem 58, contact 60, bar 63, conductor 64, coil 66, tip 70, tube 72, fitting 50, head 42, handle 12, and contact 22 to battery 16. As previously mentioned, the amount of electrical current flowing through the described circuit is insufficient to produce discomfort to the user and therefore current can safely be passed through the handle 12.

When the operator releases his grip on handle 12, the springs 88, 90 bias the trigger arm 76 counterclockwise on pivot 82, and switch arm 62 raises to break the electrical circuit from the batteries 16, 18 to coil 66 and the tip 68 then cools and the soldering operation is completed.

When it is necessary to change the batteries or recharge them, if they are of the rechargeable type, the set screw 26 is loosened, the base 24 is dropped, and the batteries 16, 18 removed both, or individually, depending on the service requirement.

While the present invention has been described in connection with one example embodiment it will be understood that this is illustrative and not restrictive thereof. Those skilled in the art can be presumed to make numerous revisions and adaptations of the invention to suit individual design requirements and it is intended that such revisions and adaptations as incorporate the herein disclosed principle will be included within the scope of the following claims.

I claim as my invention:

1. A soldering iron comprising a hollow handle, battery means carried within said handle and having positive and negative terminals at the top and bottom of said handle, a generally hollow head member of electrical conducting material secured to the top of said handle and electrically connected to the battery terminal at the bottom of the handle, a hollow soldering tip of electrical conducting material projecting outwardly from one side of said head and electrically connected thereto, said soldering tip being closed at its forward end remote from its other end which is connected to said hollow head member, an electrical heating coil disoposed within said tip, an electrical connection between one end of said coil and the forward end of said tip, means electrically insulating the remainder of the heating coil from said tip, an electrical insulating member carried within said hollow head member adjacent said other end of the soldering tip, a cantilever resilient switch arm mounted on said insulating member and projecting backwardly from said other end of the soldering tip and into the interior of said hollow head member, an electrical connection between said switch arm and the other end of said heating coil, an electrical contact member electrically connected to the terminal of said battery means at the top of said handle and positioned beneath said cantilever switch arm, and a trigger pivotally supported on said hollow head member and operable through a non-conductive portion thereof to effect displacement of said resilient switch arm into engagement with said contact member to thereby effect a complete electrical circuit between said battery means and said coil to produce heating of said tip for a soldering operation.

2. A soldering iron comprising a hollow handle, battery means carried within said handle and having positive and negative terminals at the top and bottom of said handle, a generally hollow head member of electrical conducting material secured to the top of said handle and electrically connected to the battery terminal at the bottom of the handle, means forming a hollow projection carried at one side of said hollow head member with the interior of said hollow projection communicating with the interior of said hollow head member, a hollow soldering tip of electrical conducting material having an open inner end carried within said means forming a hollow projection on the head member, said soldering tip being closed at its forward end, an electrical heating coil disposed within said tip, an electrical connection between one end of said coil and the forward end of said tip, means electrically insulating the remainder of said coil from the tip, an electrical insulating member carried within said means forming a hollow projection adjacent the open inner end of said soldering tip, a cantilever resilient switch arm mounted on said insulating member and projecting backwardly from said open end of the soldering tip and into the interior of said hollow head member, an electrical connection between said switch arm and the other end of said heating coil, a block of electrical insulating material carried within said hollow head member, an electrical contact member extending through said block of insulating material and having its lower end in engagement with the battery terminal at the top of said handle, the top of said electrical contact member extending through the insulating block being beneath said cantilever resilient switch arm, means for forcing said switch arm downwardly into engagement with said contact member extending through the insulating block, said latter-mentioned means comprising a generally L-shaped trigger pivotally connected at one end to said hollow head member and having a first portion which overlies said resilient switch arm and a second portion depending downwardly therefrom behind the resilient switch arm and along a side of said handle, and electrical insulating means disposed between said first portion of the trigger and said resilient switch arm, the arrangement being such that when the handle is grasped and the second portion of the trigger moved inwardly toward the center of the handle, the first portion of the trigger will be moved downwardly to force said resilient switch arm into engagement with said contact member carried within the insulating block to thereby complete an electrical circuit between said battery and said heating coil.

3. The soldering iron in accordance with claim 2 wherein a slot is formed in said head portion and said handle and wherein said trigger is disposed within said slot.

References Cited in the file of this patent

UNITED STATES PATENTS

| | | |
|---|---|---|
| 761,372 | Gill | May 31, 1904 |
| 874,357 | Dickens | Dec. 17, 1907 |
| 1,470,135 | Ballweg | Oct. 9, 1923 |
| 2,765,390 | Chapel et al. | Oct. 2, 1956 |
| 2,973,422 | Smith | Feb. 28, 1961 |

FOREIGN PATENTS

| | | |
|---|---|---|
| 415,161 | Italy | Sept. 28, 1946 |
| 946,814 | France | Dec. 27, 1948 |
| 454,174 | Italy | Jan. 12, 1950 |
| 976,256 | France | Oct. 25, 1950 |